United States Patent [19]

Iwata

[11] Patent Number: 4,610,232
[45] Date of Patent: Sep. 9, 1986

[54] IGNITION TIMING CONTROL APPARATUS FOR INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 657,245

[22] Filed: Oct. 3, 1984

[30] Foreign Application Priority Data

Oct. 4, 1983 [JP] Japan ................................ 58-188096

[51] Int. Cl.$^4$ ............................................... F02P 5/04
[52] U.S. Cl. .................................................... 123/425
[58] Field of Search ......................................... 123/425

[56] References Cited

U.S. PATENT DOCUMENTS

| 3,718,126 | 2/1973 | Oishi et al. | 123/425 |
| 3,822,583 | 7/1974 | Keller et al. | 123/425 |
| 4,351,281 | 9/1982 | Geiger | 123/425 |
| 4,440,129 | 4/1984 | Iwata | 123/425 |
| 4,444,172 | 4/1984 | Sellmaier | 123/425 |

Primary Examiner—Ronald B. Cox
Attorney, Agent, or Firm—Leydig, Voit & Mayer, Ltd.

[57] ABSTRACT

An ignition timing control apparatus for an internal combustion engine capable of using as a fuel a regular (low-octane) gasoline, a premium (high-octane) gasoline. The engine produces knocks when the ignition timing is advanced beyond a reference ignition timing determined as a function of the type of gasoline being used. This advance ignition timing control apparatus detects the knocks, and provides as an output a signal according to the occurrence rate of the knocks which essentially indicates the type of gasoline in use. By means of this signal, this ignition timing control apparatus changes over one reference ignition timing adapted for premium gasoline to the other reference ignition timing adapted for regular gasoline to retard the current ignition timing. At the same time, in a predetermined operating region of the engine, the ignition timing can be fixed in the retard or advance mode angle, whereby a desirable ignition timing for an engine is provided so as to improve the performance of the engine.

7 Claims, 7 Drawing Figures

IGNITION TIMING CONTROL APPARATUS FOR INTERNAL COMBUSTION ENGINE

BACKGROUND OF THE INVENTION

This invention relates to an ignition timing control apparatus for an internal combustion engine, and in particular to an ignition timing control apparatus for an internal combustion engine which is operable either with a low-octane rating fuel or a high-octane rating fuel.

It is well known in the art that the octane rating of fuel gasoline is greatly interrelated with a knock-resistibility in an internal combustion engine. Namely, as the octane rating of gasoline becomes higher, the knocking of an engine correspondingly decreases.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of the low-octane gasoline. In the figure, point A indicates a knock limit for the low-octane gasoline while point B indicates a knock limit for the high-octane gasoline, in which knock arises when the angle of the ignition timing is advanced beyond these points. According to FIG. 1, it is possible to advance the angle of the ignition timing up to a point B when using the high-octane gasoline, where the output shaft torque will be higher as compared with the use of the low-octane gasoline.

FIG. 2 shows an ignition timing characteristic representing points A and B as a function of engine speed. It is seen that the interval between the characteristics A and B is constant as a function of the engine speed. Therefore, in an internal combustion engine with such a characteristic, it will be possible to increase the output of the engine by advancing the ignition timing by a predetermined angle if a fuel used in the engine is changed over from the low-octane rating gasoline to the high-octane rating gasoline.

However, in a conventional ignition timing control apparatus for an internal combustion engine, the reference ignition timing characteristic is preset only for a predetermined gasoline, e.g. the low-octane rating gasoline, and therefore when using the high-octane rating gasoline, an increase in the output of the engine can not be expected without any change or modification thereof, so that the presetting of the reference ignition timing must be repeated towards the advance angle by some method.

Also if the ignition timing is set in the direction of the advance angle adapted for the premium gasoline, disadvantageous events may occur at the starting time of engine or in other operating regions.

U.S. Pat. No. 3,822,583 issued to Keller et al. on July 9, 1984 discloses "Method for Determining Octane Ratings of Fuels under Road Conditions" in which knocking is detected to measure the octane rating of fuels, thereby controlling the ignition timing.

U.S. Pat. No. 3,718,126 issued to Oishi et al. on Feb. 27, 1973 discloses "Ignition Timing Regulating Device for Internal Combustion Engine" in which the rotating speed, load, etc. of an engine is detected to phase-shift the ignition timing.

SUMMARY OF THE INVENTION

It is accordingly a general object of the invention to provide an ignition timing control apparatus for an internal combustion engine wherein the occurrence of knocks is detected, whether a fuel used for the engine is of a high-octane rating or a low-octane rating is determined according to the detected value, and the ignition timing is set toward the advance angle or retard angle in response to the determined result, whereby the ignition timing is automatically changed over according to the type of the fuel in use, while at the same time, during a predetermined operating region of the engine, the ignition timing is fixed at either an advance or retard angle regardless of whether or not the change-over has been made.

More specifically, the present invention provides an ignition timing control apparatus for an internal combustion engine comprising: means for sensing knock signals in the engine; means, responsive to the output of the sensing means, for deriving the knock signals; means, responsive to the output of the knock signal deriving means, for determining whether or not the current ignition timing characteristic is required to be changed over; means, responsive to the output of the determining means, for setting a reference ignition timing characteristic; and, means for overriding the output of the determining means when the engine lies in a predetermined operating region.

Preferably, the reference ignition timing setting means includes means for phase-shifting the reference ignition timing characteristic of one of high-octane rating and low-octane rating fuels from that of the other of the fuels by a preset fixed value. The reference ignition timing setting means includes means for separately presetting the reference ignition timing characteristics for both of the high-octane rating and low-octane rating fuels.

The knock signal deriving means comprises a bandpass filter connected to the sensing means to pass therethrough only a frequency component inherent in the knocks, a noise level detector for converting the output of the bandpass filter into a DC voltage with a predetermined amplification, the DC voltage being higher than the noise component while lower than the knock component of the filtered output, and a comparator for comparing the outputs of the filter and the noise level detector to derive the knock signals. The determining means comprises a pulse generator connected to the comparator which generates one pulse per the occurrence of a knock during one ignition, and a counter connected to the pulse generator for counting the output pulses of the pulse generator and to provide a logic signal indicating the presence of a predetermined knock occurrence rate per a predetermined time interval defined by a timer.

The reference ignition timing setting means comprises a flip-flop set by the logic signal from the counter, a reference ignition timing signal generator the ignition timing characteristic of which is set for a high-octane rating fuel, an ignition timing phase-shifter for shifting the timing of the reference ignition timing signal generator in dependence on the output of the flip-flop to control the ignition timing of an ignition coil.

The overriding means comprises operating region sensing means for the engine, and a overriding circuit, responsive to the operating region sensing means, connected between the flip-flop and the ignition timing phase-shifter. The operating region sensing means comprises an engine speed sensor and an intake air pressure sensor. The overriding circuit comprises an AND gate one input of which is connected to the flip-flop, a first OR gate one input of which is connected to the engine speed sensor and the other input of which is connected to the pressure sensor, and a second OR gate one input of which is connected to the output of the AND gate and the other of which is connected to the pressure sensor, the output of the first OR gate being connected to the other input of the AND gate, and the output of the second OR gate being connected to the phase-shifter.

BRIEF DESCRIPTION OF THE DRAWINGS

Throughout the figures, the same reference numerals indicate identical or corresponding portions and element.

DETAILED DESCRIPTION OF THE PREFERRED EMBODIMENTS

The present invention will now be described in detail along the preferred embodiment illustrated in the accompanying drawings.

Figure 3:
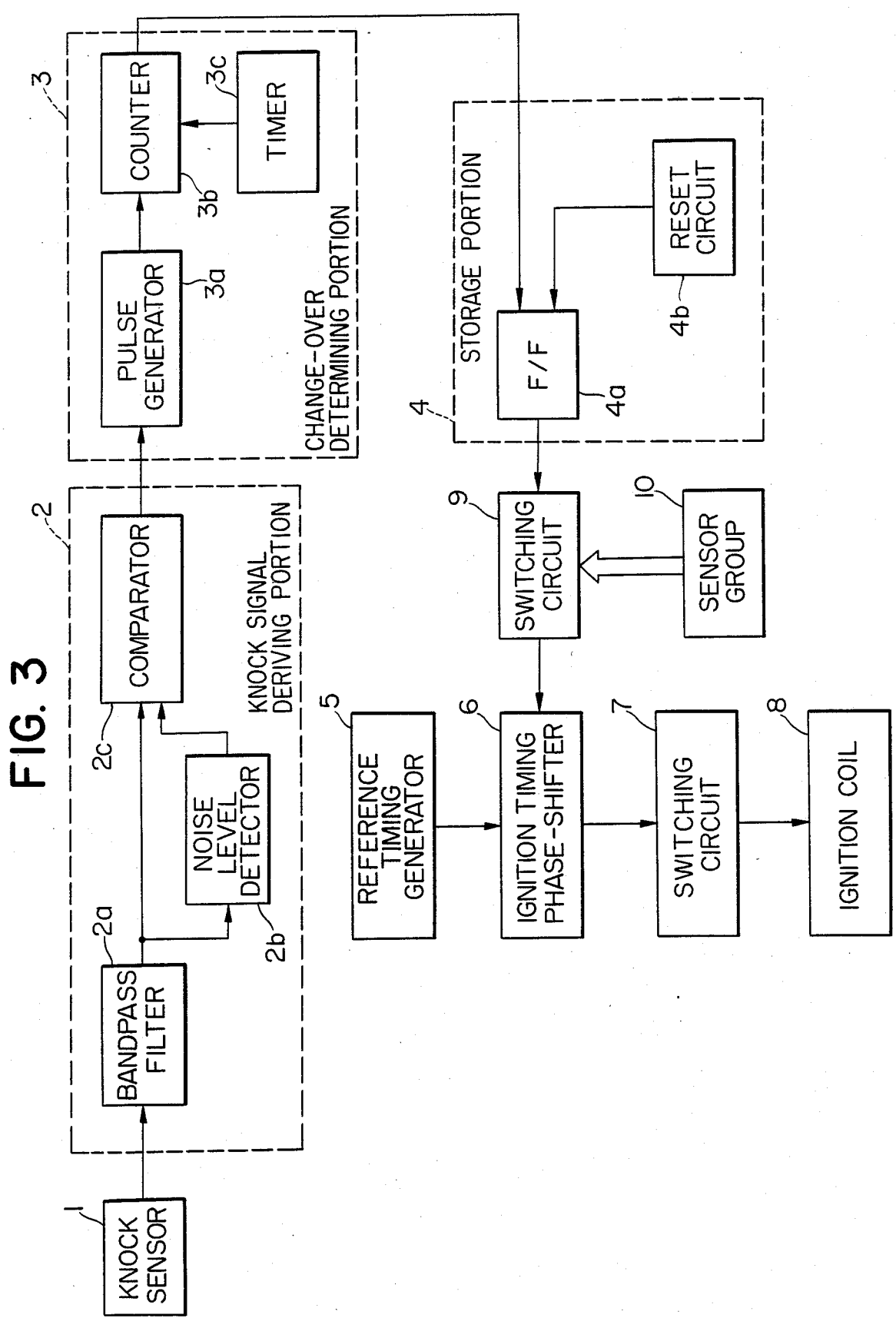
FIG. 3 shows a block diagram of a preferred embodiment of an ignition timing control apparatus for an internal combustion engine in accordance with this invention.

FIG. 3 shows one embodiment of this invention. Referring to FIG. 3, a knock sensor 1 is mounted on an internal combustion engine (not shown) to sense knocks of the engine. The output signal of the knock sensor 1 is received by a knock signal deriving portion 2, enclosed with dotted lines, having a bandpass filter 2a, a noise level detector 2b, and a comparator 2c. The input of the bandpass filter 2a is connected to the knock sensor 1 and the output thereof is connected to the noise level detector 2b and one input of the comparator 2c. The output of the noise level detector 2b is connected to the other input of the comparator 2c.

The knock signal deriving portion 2 is connected to a change-over determining portion 3 for ignition timing enclosed with dotted lines. This determining portion 3 performs an operation based on the output of the knock signal deriving portion 2 to determine whether or not the ignition timing is required to be changed over. The determining portion 3 is composed of a pulse generator 3a, a counter 3b, and a timer 3c. The input and the output of the pulse generator 3a are respectively connected to the output of the comparator 2c and the counting input of the counter 3b. The timer 3c is connected to the reset input of the counter 3b. It is to be noted that the change-over determining portion 3 may serve as a means for discriminating between a high-octane rating fuel and a low-octane rating fuel as the a fuel used in the engine as will be described later.

The change-over determining portion 3 is connected to a storage portion 4, enclosed with dotted lines, which stores the output of the change-over determining portion 3, that is the output of the counter 3b. The storage portion 4 is composed of a flip-flop (hereinafter referred to as F/F) 4a and a reset circuit 4b. The set input of the F/F 4a is connected to the output of the counter 3b and the reset input thereof is connected to the reset circuit 4b.

A generator 5 generates a reference ignition timing signal of the engine, and an ignition timing phase-shifter 6 phase-shifts the output signal of the reference ignition timing signal generator 5 according to the output of a overriding circuit 9. A overriding circuit 7 energizes or deenergizes an ignition coil 8 in synchronization with the output signal of the phase-shifter 6 to produce a high voltage necessary for the ignition of the engine.

The overriding circuit 9 has two logic inputs, one of which is connected to the output of the F/F 4a and the other of which is connected to the output of a sensor group 10 for detecting the operating condition of an engine. The arrangements and operations of the overriding circuit 9 and the sensor group 10 will be described later.

Figure 4:
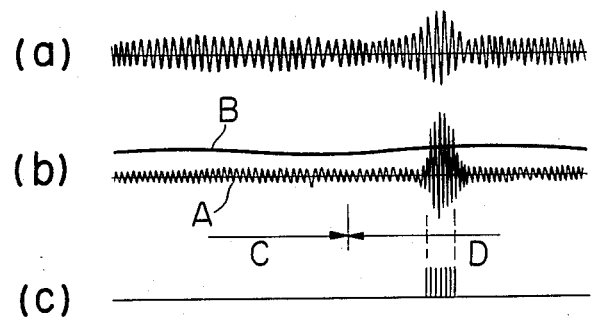
FIGS. 4 to 6 show waveform graphs for explaining the operation of the various portions and elements shown in FIG. 3, respectively; and, FIG. 7 shows a detailed circuit diagram of the overriding circuit and the sensor group used in FIG. 3.

The operation of each of the block portion will now be described. FIG. 4 shows waveforms indicating the operation of each of the circuits in the knock signal deriving portion 2.

The knock sensor 1 is a vibration acceleration sensor generally well known as being mounted on the cylinder block (not shown) etc., of an engine, which converts the mechanical vibration into an electrical signal, and generates a vibrating wave signal, as shown in FIG. 4(a), to be received by the bandpass filter 2a. The bandpass filter 2a only passes therethrough a frequency component inherent in knocks, from the output signal of the knock sensor 1, thereby suppressing a noise component not relating to knocks to provide an output good in S/N ratio as shown in FIG. 4(b) by wave-form A.

The noise level detector 2b may be composed of, e.g. a half-wave rectifying circuit, an averaging circuit, and an amplifying circuit etc. The noise level detector 2b converts the output of the bandpass filter 2a (FIG. 4(b), wave-form A) into a DC voltage by the half-wave rectification and the averaging operations, the DC voltage being amplified with a predetermined amplification to have a level, as shown in FIG. 4(b) by a wave-form B, higher than the noise component of the output signal of the bandpass filter 2a (FIG. 4(b), wave-form A) but lower than the knock component of the same.

The comparator 2c compares the output signal of the noise level detector 2b (FIG. 4(b), wave-form B) with the output of the bandpass filter 2a (FIG. 4(b), wave-form A). In the case where no knocks occur (FIG. 4, section C), since the output signal of the bandpass filter 2a (FIG. 4(b), wave-form A) is not greater than the output signal of the noise level detector 2b (FIG. 4(b), wave-form B), the comparator 2c provides no output, while in the case where knocks occur (FIG. 4, section D), since the former signal is greater than the latter signal, the comparator 2c provides as an output a pulse train as shown in FIG. 4(c). Accordingly, the output pulse train from the comparator 2c can be used for determining whether or not knocks have occurred.

Figure 5:
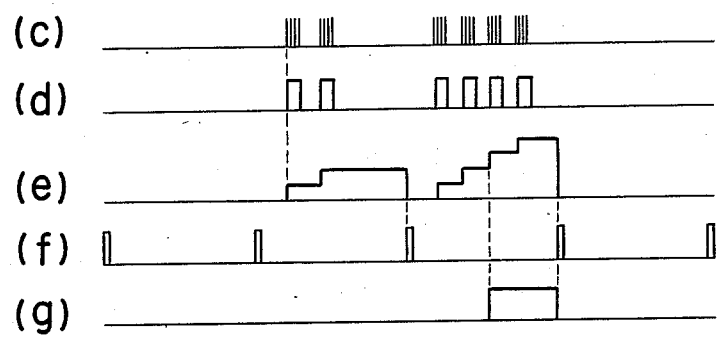

FIG. 5 shows waveforms indicating the operation of each portion except the knock signal deriving portion 2. The pulse generator 3a provides as an output therefrom pulses as shown in FIG. 5(d) in response to the pulse train output from the comparator 2c as shown in FIG. 5(c) which corresponds to FIG. 4(c). As seen from FIGS. 5(c) and 5(d), the pulse generator 3a provides as an output one pulse in response to the occurrence of knocks for during one ignition. The output pulses from the pulse generator 3a are counted by the counter 3b the count of which is shown in FIG. 5(e). The timer 3c provides as an output a pulse per a predetermined time interval to reset the count of the counter 3b to zero, as shown in FIG. 5(f). The output of the counter 3b is at a high logic level when the count of the counter 3b exceeds a predetermined count, which is three counts in the case of FIG. 5, as shown in FIG. 5(g). Namely, the ignition timing change-over determining circuit 3 provides as an output a high level signal upon the occurrence of a predetermined number of knocks within a predetermined time interval. This corresponds to the operation of an occurrence rate of knocks, which consequently enables to determine whether or not the change-over of the ignition timing is necessary.

Figure 6:

FIG. 6 shows waveforms indicating the operations of the storage portion 4, the overriding circuit 9, and the ignition timing phase-shifter 6. FIG. 6(g) corresponds to FIG. 5(g), showing the output of the counter 3b representing the discriminated result of the change-over determining portion. It is to be noted that the output of the counter 3b is repetitively and alternatively at a high logic level and a low logic level because the counter 3b is repetitively reset by the timer 3c at a predetermined time interval. The reset circuit 4b provides as an output therefrom a pulse at the high level at the starting time of the engine, as shown in FIG. 6(h). The F/F 4a is set by the high level output from the counter 3b to provide a high level output while it is reset by the high level output from the reset circuit 4b. The operation of the F/F 4a is shown in FIG. 6(i). At the starting time of engine, the F/F 4a is reset by the reset circuit 4b to provide a low level output, which indicates an "advance angle mode of operation" for not changing over the ignition timing. When the output of the counter 3b becomes the high level as shown in FIG. 5(g) or FIG. 6(g), the output of the F/F 4a is changed over to the high level, which indicates a "retard angle mode of operation" for changing over the ignition timing. Afterwards, the retard mode of operation is retained until the engine stops. Accordingly, the output of the F/F 4a remains at the low level, indicating the adavance mode of operation, unless the output of the counter 3b becomes the high level after the starting of the engine.

The overriding circuit 9 performs a logic operation by the use of the outputs of the F/F 4a and the sensor group 10, whereby, in a predetermined operating region of the engine, the ignition timing of the engine is fixed at an ignition timing either in the direction of the retard angle or the advance angle regardless of the output mode of the F/F 4a, while, when the engine is operating outside of the predetermined operation region, the ignition timing of the engine is determined depending upon the output mode of the F/F 4a. An engine speed sensor, an intake air pressure sensor, a water temperature sensor, etc., may be used for the sensor group 10.

Figure 7:
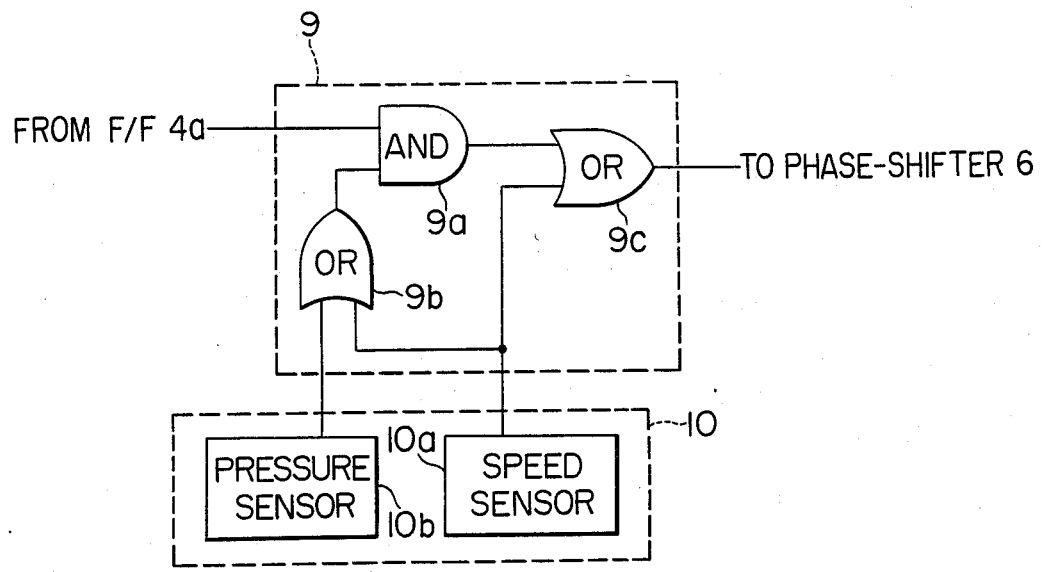

FIG. 7 shows one specific example of the overriding circuit 9 and the sensor group 10. The overriding circuit 9 includes an AND gate 9a, OR gates 9b and 9c, and the sensor group 10 includes an engine speed sensor 10a and an intake air pressure sensor 10b. One input of the AND gate 9a is connected to the output of the F/F 4a and the other input thereof is connected to the output of the OR gate 9b. One input of the OR gate 9b is connected to the pressure sensor 10b and the other input thereof is connected to the engine speed sensor 10a. One input of the OR gate 9c is connected to the output of the AND gate 9a and the other input thereof is connected to the speed sensor 10a. The output of the OR gate 9c is connected to the control input of the ignition timing phase-shifter 6.

It is to be noted that the speed sensor 10a provides as an output therefrom a voltage at the high level when the speed is low at the starting time of the engine while providing as an output therefrom a voltage at the low level when the speed is high other than the starting time of the engine, and that the pressure sensor 10b provides as an output therefrom a voltage at the low level when the negative pressure is high at a light load while providing as an output therefrom a voltage at the high level when the engine is at a high load mode of operation.

Now, in the case where the engine is starting so that the speed sensor 10a has a high level output, the output of the overriding circuit 9 or the output of the OR gate 9c becomes the high level, rendering the engine in the retard mode. This is because it is desirable to render the engine in the retard mode since the advance mode at the starting time tends to cause the engine to have a starting lock.

In the case where the engine is at a light load mode of operation i.e. an idling mode of operation where the engine rotates at a speed above the starting speed, the output of the pressure sensor 10b becomes the low level and the output of the speed sensor 10a also becomes the low level so that the output of the OR gate 9b becomes the low level, thereby making the output of the AND gate 9a at the low level regardless of the output mode of the F/F 4a inputed to the AND gate 9a. Accordingly, both inputs of the OR gate 9c are at the low level causing the output thereof to be at the low level, namely, the advance mode of operation. This is because it is desirable with respect to the improvement of engine output to set the ignition timing in the direction of the advance angle since no knock occurs when the engine is at the light load mode of operation.

On the other hand, in the case where the engine rotates at a high speed which is not the starting time of the engine, and at a high load operating condition, the output of the speed sensor 10a is at the low level while the output of the pressure sensor 10b is at the high level so that the output of the OR gate 9b becomes the high level, thereby enabling the output of the F/F 4a to appear at the outputs of the AND gate 9a and in turn the OR gate 9c.

It is to be noted that the OR gate 9b and the conductor connecting the OR gate 9b to the sensor 10a may be omitted while the sensor 10b is directly connected to the AND gate 9a to perform the same function as described above.

Thus, either at the starting time or during the light load condition of the engine, the control mode of the ignition timing can be fixed toward the retard angle or the advance angle regardless of the output mode of the F/F 4a instructed by the ignition timing change-over determining portion 3.

FIG. 6(j) shows the output mode of the overriding circuit 9 wherein the high level represents the retard mode while the low level represents the advance mode.

On the other hand, the ignition timing phase-shifter 6 controls the phase angle of the input signal towards the retard mode according to the control voltage. This phase-shifter 6 is well known in the art of an ignition timing control apparatus and accordingly, the description thereof is omitted. The reference ignition timing signal generator 5 may be, for example, an ignition signal generator, included in the distributor, which detects the rotation of the crank shaft of the engine and provides as an output therefrom a signal indicating ignition timings. The ignition timing characteristic of this reference ignition timing signal generator 5 is set by an engine speed and a load condition, the engine speed being set, for example, at the characteristic shown in FIG. 2 by the curve B. The output signal of the generator 5 shown in FIG. 6(*k*) is received by the phase-shifter 6, which also receives the output of the overriding circuit 9 as a controlling voltage input to phase-shift the output signal of the signal generator 5 according to the output mode of the overriding circuit 9. The output signal of the phase-shifter 6 is shown in FIG. 6(*l*).

Figure 1:
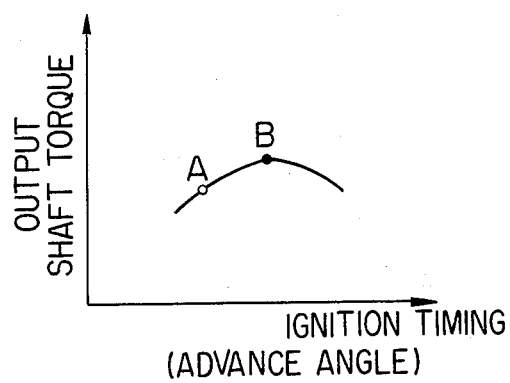
FIG. 1 shows an output shaft torque characteristic of an internal combustion engine as a function of ignition timing.
Figure 2:
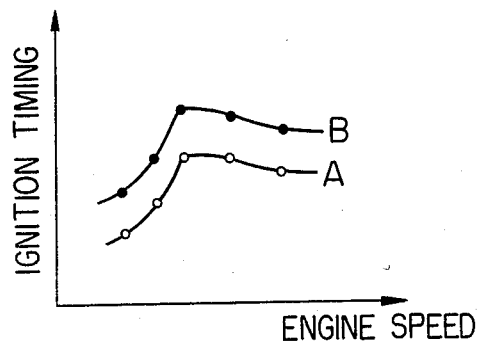
FIG. 2 shows an ignition timing characteristic as a function of engine speed.

Now assuming that the output of the overriding circuit 9 is at the low level (advance mode), the phase-shifter 6 performs no phase-shifting operation so that it directly passes therethrough the output signal of the signal generator 5 without any modification, namely the actual ignition timing characteristic remains as shown in FIG. 2 by the curve B.

When the engine is at a high speed mode of operation indicating a non-starting and a high load mode of operation, and when the output of the overriding circuit 9 is switched over from the low level (advance mode) to the high level (retard mode) in response to the discrimination by the determining portion 3 that the change-over is necessary in the presence of knocks, the phase-shifter 6 phase-shifts the output signal of the reference ignition timing signal generator 5 by a predetermined retard angle, as shown in FIG. 6(*l*). Therefore, the actual ignition timing characteristic assumes to be as shown in FIG. 2 by the characteristic curve A.

Thus, when using the high-octane (premium) gasoline for the engine, such a knock as requiring the change-over of the reference ignition timing does not arise in the characteristic B shown in FIG. 2, and therefore the ignition timing is not changed over, remaining in the characteristic curve B in FIG. 2. On the other hand, when using the low-octane (regular) gasoline for the engine, the ignition timing characteristic curve A in FIG. 2 resides in a region where knocks arise and therefore the engine generates knocks. Therefore, if the engine is at a high speed, namely, not during the starting time, and at a high load mode of operation, then the knocks are detected through the knock signal deriving portion 2, the ignition timing change-over determining portion 3, the storage portion 4, and the ignition timing phase-shifter 6 so that the ignition timing is changed over to the retard mode and fixed at the ignition timing characteristic curve A in FIG. 2 where no knock arises even when the regular gasoline is used. However, at the starting time of engine, the ignition timing is fixed at the side of the retard angle while during the light load operating condition of the engine or idling operation of engine the ignition timing is fixed at the side of the advance angle.

As is described in the above embodiments, in the case where a regular gasoline and a premium gasoline are alternatively used for an engine, whether the fuel in use is the regular gasoline or the premium gasoline can be distinguished by the detection of the occurrence of knocks, and the distinguished result advantageously enables the reference ignition timing to be automatically changed over to the one for the regular gasoline or the premium gasoline, thereby enhancing the engine output while preventing any knocks from occurring. In this connection, in a predetermined operating region of the engine, the ignition timing can be fixed in the retard or advance mode angle, whereby a desirable ignition timing for an engine is provided so as to improve the performance of the engine.

It is to be noted that this invention is not limited to the described and illustrated embodiment but various modification may be made without departing from the spirit of this invention.

What I claim as a patent is:

1. An ignition timing control apparatus for an internal combustion engine comprising:

vibration acceleration sensing means for sensing knock signals of said engine;

means responsive to the output of said sensing means for deriving said knock signals including a bandpass filter connected to said sensing means to pass therethrough only a frequency component inherent in the knocks, a noise level detector for converting the output of said bandpass filter into a DC voltage with a predetermined amplification, said DC voltage being higher than the noise component while lower than the knock component of the filtered output, and a comparator for comparing the outputs of said filter and said noise level detector to derive said knock signals;

means responsive to the output of said knock signal deriving means for determining whether the current ignition timing characteristic is required to be changed over including a pulse generator connected to said comparator to generate one pulse per the occurrence of knock during one ignition and a counter connected to said pulse generator to count the output pulses of said pulse generator and to provide a logic signal indicating the presence of a predetermined knock occurrence rate per a predetermined time interval defined by a timer;

means responsive to the output of said determining means for setting a reference ignition timing characteristic including a flip-flop set by said logic signal from said counter, a reference ignition timing signal generator, the ignition timing characteristic of which is set for a high-octane rating fuel, an ignition timing phase-shifter for shifting the timing of said reference ignition timing signal of said generator by a preset fixed value dependent upon the output of said flip-flop to control the ignition timing of an ignition coil; and means for overriding the output of said determining means when said engine lies in predetermined operating regions to fix the ignition timing corresponding to said predetermined operating regions including operating region sensing means for said engine comprising an engine speed sensor, an intake air pressure sensor and an overriding circuit responsive to said operating region sensing means connected between said flip-flop and said ignition timing phase-shifter, said overriding circuit comprising and AND gate, one input of which is connected to said flip-flop, a first OR gate, one input of which is connected to said engine speed sensor and the other input of which is connected to said pressure sensor, and a second OR gate, one input of which is connected to the output of said AND gate and the other of which is connected to said pressure sensor, the output of said first OR gate being connected to the other input of said AND gate, and the output of said second OR gate being connected to said phase-shifter.

2. An ignition timing control apparatus for an internal combustion engine comprising:
   means for sensing knock signals of said engine;
   means responsive to the output of said sensing means for deriving said knock signals;
   means responsive to the output of said knock signal deriving means for determining whether the current ignition timing characteristic is required to be changed over, said determining means providing a logic signal;
   means responsive to said logic signal from said determining means for setting a reference ignition timing characteristic including a flip-flop set by said logic signal, a reference ignition timing signal generator, the ignition timing characteristic of which is set for a high-octane rating fuel, and an ignition timing phase-shifter for shifting the timing of said reference ignition signal of said generator from said high-octane rating fuel characteristic by a preset fixed value to a low-octane rating fuel characteristic output responsive to the set output of said flip-flop to control the ignition timing of an ignition coil; and
   means for overriding the output of said determining means when said engine lies in predetermined operating regions to fix the ignition timing corresponding to said predetermined operating regions comprising operating region sensing means for said engine and an overriding circuit responsive to said operating region sensing means connected between said flip-flop and said ignition timing phase-shifter.

3. An ignition timing control apparatus for an internal combustion engine according to claim 2 wherein said sensing means comprises a vibration acceleration sensing means.

4. An ignition timing control apparatus for an internal combustion engine according to claim 2 wherein said knock signal deriving means comprises a bandpass filter connected to said sensing means to pass therethrough only a frequency component inherent in the knocks, a noise level detector for converting the output of said bandpass filter into a DC voltage with a predetermined amplification, said DC voltage being higher than the noise component while lower than the knock component of the filtered output, and a comparator for comparing the outputs of said filter and said noise level detector to derive said knock signals.

5. An ignition timing control apparatus for an internal combustion engine according to claim 4 wherein said determining means comprises a pulse generator connected to said comparator to generate one pulse per the occurrence of said knock during one ignition, and a counter connected to said pulse generator to count the output pulses of said pulse generator and to provide a logic signal indicating the presence of a predetermined knock occurrence rate per a predetermined time interval defined by a timer.

6. An ignition timing control apparatus for an internal combustion engine according to claim 2 wherein said operating region sensing means comprises an engine speed sensor and an intake air pressure sensor.

7. An ignition timing control apparatus according to claim 2 including a reset circuit for resetting said flip-flop at the starting of the engine to supply a reset output for not changing over the ignition timing to said reference ignition timing setting means.

* * * * *